United States Patent
Harkness et al.

(10) Patent No.: US 7,158,605 B2
(45) Date of Patent: Jan. 2, 2007

(54) HEAD ASSEMBLY

(75) Inventors: Alexander W. Harkness, Gibsonia, PA (US); Michael G. Ball, Irwin, PA (US); Gregory E. Gontis, Somerset, PA (US)

(73) Assignee: Westinghouse Electric Co LLC, Pittsburgh, PA (US)

( * ) Notice: Subject to any disclaimer, the term of this patent is extended or adjusted under 35 U.S.C. 154(b) by 85 days.

(21) Appl. No.: 10/670,540

(22) Filed: Sep. 24, 2003

(65) Prior Publication Data

US 2005/0084057 A1    Apr. 21, 2005

(51) Int. Cl.
 *G21C 19/00* (2006.01)
(52) U.S. Cl. .............. 376/263; 376/262; 376/287; 376/298
(58) Field of Classification Search ........... 376/263, 376/262, 287, 298, 228
See application file for complete search history.

(56) References Cited

U.S. PATENT DOCUMENTS

| 3,851,906 | A | * | 12/1974 | Frisch et al. ........... 292/256.73 |
| 4,302,290 | A | * | 11/1981 | Mazur et al. ............... 376/287 |
| 4,678,623 | A | | 7/1987 | Malandra et al. |
| 4,830,814 | A | * | 5/1989 | Altman ........................ 376/287 |
| 5,742,652 | A | | 4/1998 | Hankinson et al. |
| 6,061,415 | A | | 5/2000 | Harkness et al. |
| 6,546,066 | B1 | | 4/2003 | Baliga et al. |
| 2003/0026377 | A1 | | 2/2003 | Baliga et al. |

FOREIGN PATENT DOCUMENTS

GB    2100496 A  * 12/1982    ................. 376/263

OTHER PUBLICATIONS

Framatome ANP, ADVENT Engineering services Team to Offer Integrated Head assembly, Nov. 30, 2001, available @http://www.framatech.com/newsreleases/newsrelease.asp?NewsNumber=148, last accessed Dec. 19, 2005.*
Kim et al., "Integrated Head Assembly for Korean Next Generation Reactor", Transactions of the 15th International Conference on Structural MEchanics in Reactor Technology, Aug. 1999.*
The simplified head assembly, Westinghouse World View 2002, available @ http://www.westinghousenuclear.com/pdf/worldview1002.pdf, last accessed May 10, 2006.*

* cited by examiner

*Primary Examiner*—Ella Colbert
*Assistant Examiner*—Daniel Lawson Greene, Jr.

(57) ABSTRACT

A head assembly for a reactor pressure vessel includes a removable closure head, an array of control rod drive mechanisms, a seismic support platform, a missile shield assembly and a cooling system for drawing atmospheric air across electromagnetic coil stack assemblies. The cooling system includes: a lower shroud surrounding the coil stack assemblies with an end open to the atmosphere around the CRDMs; a plurality of extending internal ducts disposed within the array of CRDMs upwardly to an upper plenum disposed above the seismic support platform and a plurality of fan assemblies disposed on the upper plenum. The missile shield is disposed within the upper plenum. The cooling system effectively cools the coil stack assemblies during fuel cycles and does not hinder access to the CRDMs during an outage. The head assembly has lift legs for transporting either the entire head assembly as an integral unit or the structure above the seismic support platform a subassembly.

7 Claims, 3 Drawing Sheets

HEAD ASSEMBLY

BACKGROUND OF THE INVENTION

The invention relates to head assemblies for nuclear reactor pressure vessels ("RPVs") and more particularly to integrated head assemblies that can be transported as integral units.

Commercial pressurized water nuclear power plants are operated to produce electric power during fuel cycles that extend for about one to two years and then are shutdown for scheduled refueling and maintenance outages that extend for up to about a month or more. At the beginning of these outages, removable RPV closure heads and overhead equipment and cooling air ductwork associated with the RPVs, including control rod drive mechanisms ("CRDMs"), CRDM cooling systems, CRDM seismic support platforms and missile shields (which collectively are known in the industry as the "head assemblies") must be disconnected and/or removed in order to gain access to the fuel assemblies disposed in the interior portions of the RPVs. Then, at the end of the outages, the head assemblies must be re-assembled before starting the following fuel cycles. See, e.g., FIG. 1 of U.S. Pat. No. 4,678,623, which discloses a prior art assembly including a concrete missile shield. The many disassembly and re-assembly steps and sub-steps tend to be complex, costly to perform and require long times on critical path schedules in radioactive environments. Updated head assembly designs permit these structures to be transported as integral units to facilitate more efficient and safer outages. However, these newer designs include modified structures for redirecting the cooling air that completely or partially enclose the CRDMs and thereby hinder access to the CRDMs for repair and maintenance purposes. See, e.g., U.S. Pat. Nos. 4,678,623; 4,828,789; 5,742,652 and 6,061,414, which are incorporated herein for their disclosures of various modular, integrated and simplified head assemblies.

While the development of integrated head assemblies and the other patented improvements have facilitated faster, safer outages, the nuclear industry is constantly searching for more efficient and safer ways of operating, refueling and maintaining their plants.

SUMMARY OF THE INVENTION

Thus, it is an object of the present invention to provide an improved head assembly that provides both effective CRDM cooling during the fuel cycles and ready access to the CRDMs during the outages. It is a further object to provide a head assembly that facilitates the disassembly and re-assembly of the head assemblies during outages. Advantageously, the present invention can be employed in upgrades of existing plants and be employed in new construction.

With these objects in view, the present invention resides in an improved head assembly for a reactor pressure vessel ("RPV") having a removable closure head and a seismic support platform spaced from the RPV closure head. An array of CRDMs is disposed between the RPV closure head and the seismic support platform, each CRDM including an electro-magnetic coil stack assembly and having a lower end supported by the RPV and an upper end supported by the seismic support platform. A lower shroud surrounds the electro-magnetic coil stack assemblies and has an upper end spaced from the seismic support platform in air flow communication with the atmosphere around the CRDMs. A plurality of internal ducts are disposed within the array of CRDMs, each duct extending from a lower end disposed in air flow communication with the lower shroud to an upper end. An upper plenum is disposed above the seismic support platform in air flow communication with the internal ducts. A missile shield assembly is disposed within the upper plenum. A plurality of fan assemblies are disposed on the upper plenum in air flow communication with the upper plenum.

Lift legs connected with the RPV closure head support the seismic support platform, the missile shield assembly and the upper plenum so that the head assembly (including CRDMs disposed between the RPV closure head and the seismic support platform and fan assemblies disposed on the upper plenum) can be removed and reinstalled as an integral assembly by a head assembly lift rig. Most preferably, each lift leg includes a lower leg member detachably connected with an upper leg member. The lower leg members connect with the RPV closure head and support the seismic support platform, thereby forming a lower subassembly (including the CRDMs). The upper leg members support the upper plenum and the missile shield assembly, thereby forming an upper subassembly (including the fan assemblies). When the upper leg members are detached from the lower leg members, the upper plenum, fan assemblies and missile shield assembly can be removed as a subassembly from above the RPV. Advantageously, the CRDMs and power and instrumentation cables and other appurtenances on the seismic support platform then may be readily inspected and serviced in place. Alternatively, when the upper leg members are attached to the lower leg members, the upper subassembly and the lower subassembly may be removed from the RPV as an integral unit.

In one embodiment of the present invention, the internal ducts extend through the seismic support platform to the upper plenum. In this embodiment, the internal ducts preferably are supported by the upper plenum, the seismic support platform and the lower shroud.

In another embodiment of the present invention, the internal ducts extend to a ring header duct disposed below the seismic support platform and at least one cross-over duct extends between the ring header duct and the upper plenum. In this embodiment, the internal ducts are supported by the ring header duct and the ring header duct is supported by the seismic support platform. Also, the cross-over duct extends around the seismic support platform and preferably has separable sections.

BRIEF DESCRIPTION OF THE DRAWINGS

The invention as set forth in the claims will become more apparent from the following detailed description of preferred embodiments thereof shown, by way of example only, in the accompanying drawings, wherein:

DESCRIPTION OF THE PREFERRED EMBODIMENTS

Figure 1:
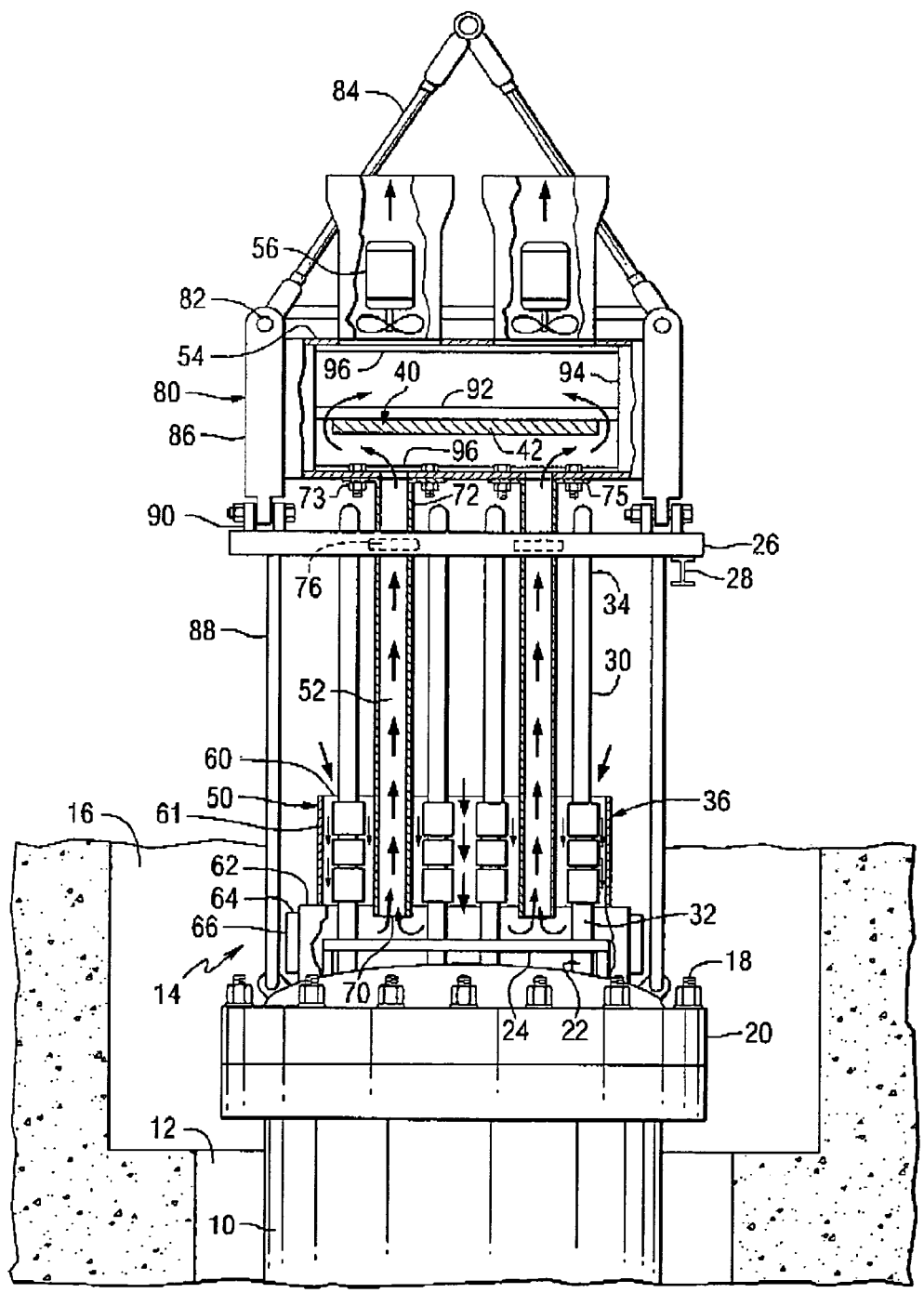
FIG. 1 is a schematic depiction of a first embodiment of a head assembly embodying the present invention.

FIG. 1 depicts a reactor pressure vessel ("RPV") 10 in a reactor cavity 12 with a head assembly 14 embodying the present invention extending upwardly in one end of a refueling canal 16. The head assembly 14 embodying the present invention may be a new construction or a backfit in an existing plants. FIG. 1 depicts a backfitted RPV 10 in the course of a fuel cycle. At the beginning of the following outage, nuts on closure studs (depicted by stud 18) must be detensioned by devices known as "stud tensioners" so that the RPV closure head 20 and overhead equipment and ductwork can be removed in order to provide unhindered access to fuel assemblies (not shown) in the RPV 10.

The head assembly 14 as depicted in FIG. 1 generally includes a RPV closure head 20 with a plurality of CRDM penetration nozzles 22. The nozzles 22 are embedded in insulation 24 in the course of fuel cycles. A seismic support platform 26 (supporting a stud tensioner rail 28) is spaced from the RPV closure head 20. An array of CRDMs 30 are disposed between the RPV closure head 20 and the seismic support platform 26. Each CRDM 30 has a lower end 32 supported by a CRDM penetration nozzle 22 and an upper end 34 supported by the seismic support platform 26. In addition, each CRDM 30 has an associated electromagnetic coil stack assembly 36 (each stack assembly depicted as three coil pairs), which generates a very substantial amount of heat that must be continuously removed during the fuel cycles. A missile shield assembly 40 having a heavy metal plate 42 is disposed over the upper ends 34 of the CRDMs 30 to absorb the energy of a failed CRDM 30.

A CRDM cooling system is designed to remove the heat generated by the electromagnetic coil stack assemblies 36. The CRDM cooling system of the present invention generally includes a lower shroud 50, internal ducts 52 disposed within the array of CRDMs 30, an upper plenum 54 and a plurality of fan assemblies 56 for drawing air from the atmosphere surrounding the CRDMs 30 across the coil stack assemblies 36 and then exhausting the air into the general atmosphere either directly or through cooling air ductwork (not shown).

The lower shroud 50 has an upper end 60 in air flow communication with the atmosphere and surrounds the coil stack assemblies 36. FIG. 1 depicts a lower shroud 50 like the shroud depicted by FIG. 1 of the above-referenced U.S. Pat. No. 4,678,623. Thus, the lower shroud 50 of a backfitted assembly may include a baffle 61 surrounding the coil stack assemblies 36 and extending to a CRDM plenum 62 having one or more duct connections 64 formerly connected with vertically extending elbow ducts. Advantageously, these elbow ducts are no longer necessary and may be removed. The connections 64 and other unused openings are preferably capped with covers 66 to prevent air from leaking into the cooling system.

Figure 2:
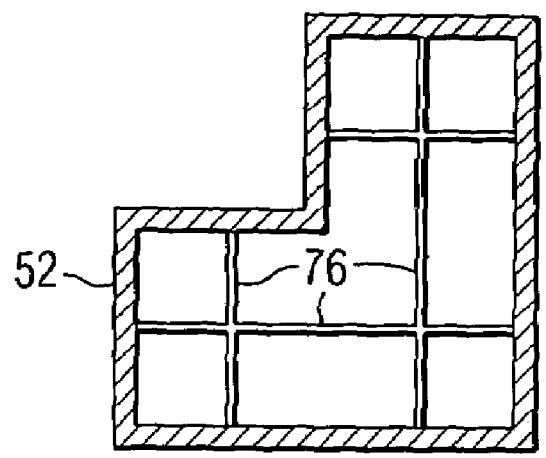
FIG. 2 is a schematic plan view of a seismic support for an internal duct disposed in the head assembly shown in FIG. 1.

Each internal duct 52 extends from a lower end 70 disposed in air flow communication with the lower shroud 50 to an upper end 72. Each internal duct 52 may have any suitable cross-section. Thus, an internal duct 52 may have an "L" shape generally as depicted by FIG. 2, a rectangular shape or any other suitable shape. The lower end 70 is preferably supported against the coil stack assemblies 36 by a resilient spring, which may be a narrow deformed length of the internal duct 52 (not shown). This arrangement will accommodate differential thermal expansion between these members at high operating temperatures in addition to laterally supporting the lower end 70. The upper end 72 of each internal duct 52 is in air flow communication with the upper plenum 54. Preferably, the upper end 72 is supported by the upper plenum 54 by, e.g., bolts 73 extending through duct flanges 75. Preferably, each internal duct 52 has an internal seismic support structure, such as cruciform 76 shown in FIG. 2, disposed in the portion of the duct 52 extending through the seismic support platform 26 for transferring seismic loads to the seismic support platform 26.

The fan assemblies 56 are disposed on the upper plenum 54 in air flow communication with the upper plenum 54 for drawing the cooling air through the CRDM cooling system. As is shown in FIG. 1, the missile shield assembly 40 is disposed in the upper plenum 54. Advantageously, the missile shield plate 42 can be cooled by the flowing air without needing ventilation holes.

The head assemblies 14 are integrated assemblies. Thus, the components of a head assembly 14 are interconnected by lift legs 80 having connections 82 for connecting with a head assembly lift rig 84 so that a plant's polar crane may be connected with the lift rig 84 to transport the head assembly 84 as an integrated unit. Most preferably, each lift leg 80 has an upper leg member 86 and a detachably connected lower leg member 88. The upper leg members 86 support the missile shield 40 and the upper plenum 54. The lower leg members 88 are connected with the RPV head 20 (via vessel lugs) and support the seismic support platform 26. The detachable leg members 86, 88 of the lift leg 80 may be attached together in a clevis assembly 90 by bolts. The clevis assembly 90 may be unbolted and the missile shield 40 and upper plenum 54 may be removed as a subassembly. Advantageously, the seismic support platform 26 may then be readily accessed in order to inspect and service the CRDMs 30, power cables (not shown), rod position indicator cables (not shown) and other appurtenances (not shown). When the lower leg members 86 and the lower leg members 88 are attached, the entire head assembly 14 may be removed as an integral unit.

Figure 3:
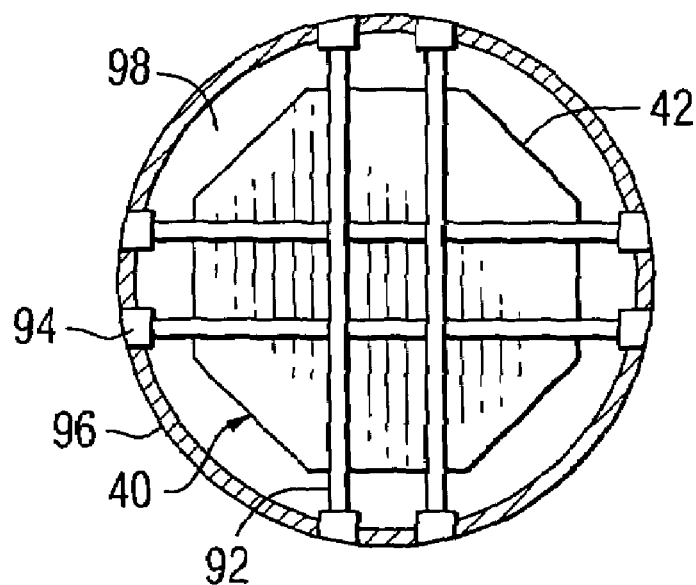
FIG. 3 is a schematic plan view of a missile shield assembly disposed in the head assembly shown in FIG. 1.

FIG. 1 generally depicts a structural arrangement by which the upper leg members 86 may support the missile shield assembly 40, upper plenum 54 and fan assemblies 56 as a subassembly. The generally horizontal plate 42, which may be a two inches thick carbon steel plate, may be supported by horizontally extending support beams 92 that are bolted or welded to the top of the horizontal plate 42. The horizontal support beams 92 may be bolted or welded directly or via angles to vertical support columns 94, which in turn may be bolted or welded to upper and lower ring girders 96. FIG. 3 depicts such an arrangement by two orthogonal pair of beams 92. Advantageously, this arrangement provides substantial area 98 for air flow around the carbon steel plate 42. The vertical support columns 94 may in turn be bolted or welded to the upper leg members 86 of the lift legs 80. Another missile shield support arrangement is illustrated by U.S. Pat. No. 6,061,415. The upper plenum 54 may be constructed of plates supported by the support columns 94 and ring girders 96 and/or upper leg members 86.

Figure 4:
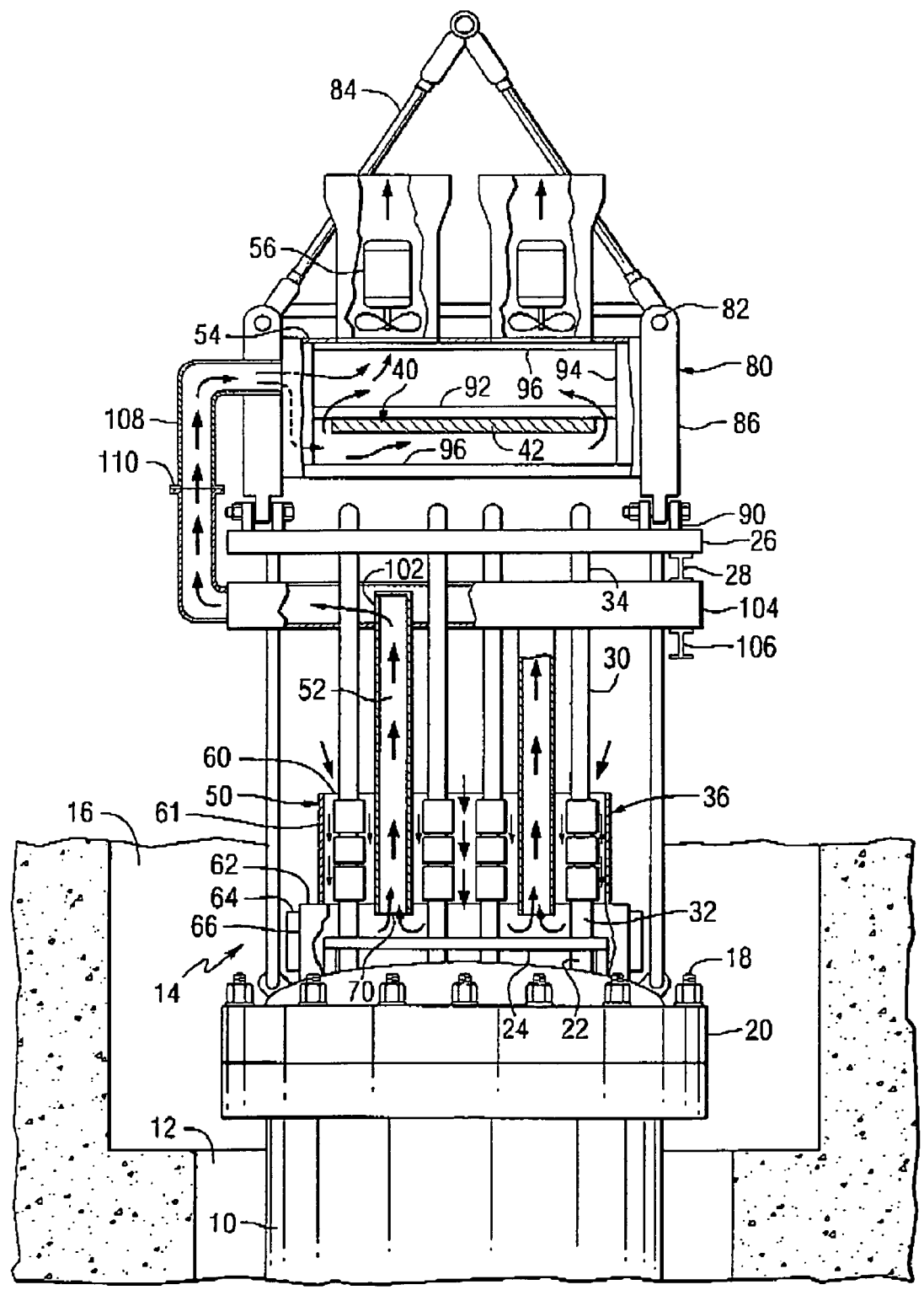
FIG. 4 is a schematic depiction of a second embodiment of a head assembly embodying the present invention.

FIG. 4 depicts another embodiment of the present invention wherein the internal ducts 52 do not extend through the seismic support platform 26. Rather, the internal ducts 52 extend upwardly to an outlet 102 communicating with a ring header duct 104. The ring header duct 104 may be supported by the stud tensioner rail 28 and may in turn support a second stud tensioner rail 106. A cross-over duct 108 may extend between the ring header duct 104 and the upper plenum 54 for providing air flow communication between the internal ducts 52 and the upper plenum 54. The crossover duct 108 may have a flanged connection 110 that may be disconnected so that the missile shield 42/upper plenum 54 subassembly may readily be removed.

While a present preferred embodiment of the present invention has been shown and described, it is to be understood that the invention may be otherwise variously embodied within the scope of the following claims of invention.

What is claimed is:

1. A head assembly for a reactor pressure vessel, comprising:
    a reactor pressure vessel closure head;
    a seismic support platform spaced from the closure head;
    an array of control rod drive mechanisms, each control rod drive mechanism including an electro-magnetic coil stack assembly and having a lower end supported by the reactor pressure vessel and an upper end extending through the seismic support platform;
    a lower shroud surrounding the electro-magnetic coil stack assemblies and having an upper end spaced from the seismic support platform in air flow communication with the atmosphere around the control rod drive mechanisms;
    a plurality of internal ducts disposed between control rod drive mechanisms within the array of control rod drive mechanisms, each duct having a lower end extending below the electro-magnetic coil stack assemblies and in air flow communication with the lower shroud and each duct having an upper end extending above the seismic support platform;
    an upper plenum disposed above the seismic support platform having inlet air openings in air flow communication with the upper ends of the internal ducts;
    a missile shield assembly disposed within the upper plenum, the missile shield having a plate superposed over and spaced from the inlet air openings of the upper plenum in air flow communication with the upper ends of the internal ducts;
    a plurality of fan assemblies disposed on the upper plenum in air flow communication with the upper plenum; and
    lift legs connected with the reactor pressure vessel closure head and supporting the seismic support platform, the upper plenum and the missile shield assembly for removal of the head assembly as an integral assembly.

2. A head assembly for a reactor pressure vessel, comprising:
    a reactor pressure vessel closure head;
    a seismic support platform spaced from the closure head;
    an array of control rod drive mechanisms, each control rod drive mechanism including an electro-magnetic coil stack assembly and having a lower end supported by the reactor pressure vessel and an upper end extending through the seismic support platform;
    a lower shroud surrounding the electro-magnetic coil stack assemblies and having an upper end spaced from the seismic support platform in air flow communication with the atmosphere around the control rod drive mechanisms;
    a plurality of internal ducts disposed within the array of control rod drive mechanisms, wherein each duct has a lower end extending below the electro-magnetic coil stack assemblies disposed in air flow communication with the lower shroud and each duck has an upper end, and wherein the internal ducts extend within the array of control rod drive mechanisms through the seismic support platform and have internal plates in the section of the ducts disposed in the seismic support platform;
    an upper plenum disposed above the seismic support platform having inlet air openings in air flow communication with the upper ends of the internal ducts;
    a missile shield assembly disposed within the upper plenum, the missile shield having a plate superposed over and spaced from the inlet air openings of the upper plenum in air flow communication with the upper ends of the internal ducts;
    a plurality of fan assemblies disposed on the upper plenum in air flow communication with the upper plenum; and
    lift legs connected with the reactor pressure vessel closure head and supporting the seismic support platform, the upper plenum and the missile shield assembly for removal of the head assembly as an integral assembly.

3. The head assembly of claim 1, wherein the internal ducts are bolted to the upper plenum and wherein each lift leg comprises an upper leg member attached by a clevis assembly to a lower leg member with the upper plenum supported by the upper leg member and with the seismic support platform supported by the lower leg member.

4. The head assembly of claim 1, wherein the internal ducts are a backfit into an existing head assembly.

5. A head assembly for a reactor pressure vessel, comprising:
    a reactor pressure vessel closure head;
    a seismic support platform spaced from the closure head;
    an array of control rod drive mechanisms, each control rod drive mechanism including an electro-magnetic coil stack assembly and having a lower end supported by the reactor pressure vessel and an upper end extending through the seismic support platform;
    a lower shroud surrounding the electro-magnetic coil stack assemblies and having an upper end spaced from the seismic support platform in air flow communication with the atmosphere around the control rod drive mechanisms;
    a control rod drive mechanism plenum disposed between the closure head and the lower shroud;
    a plurality of internal ducts disposed between control rod drive mechanisms within the array of control rod drive mechanisms, each duct having a lower end disposed in the control rod drive mechanism plenum and each duct having an upper end extending above the seismic support platform;
    an upper plenum disposed above the seismic support platform having inlet air openings in air flow communication with the upper ends of the internal ducts;
    a missile shield assembly disposed within the upper plenum, the missile shield having a plate superposed over and spaced from the inlet air openings of the upper plenum in air flow communication with the upper ends of the internal ducts;
    a plurality of fan assemblies disposed on the upper plenum in air flow communication with the upper plenum; and
    lift legs connected with the reactor pressure vessel closure head and supporting the seismic support platform, the upper plenum and the missile shield assembly for removal of the head assembly as an integral assembly.

6. The head assembly of claim 5, wherein the internal ducts have an L shaped cross-section within the seismic support platform.

7. The head assembly of claim 5, wherein the internal ducts have a rectangular shaped cross-section.

* * * * *